(12) United States Patent
Kim

(10) Patent No.: US 8,579,202 B2
(45) Date of Patent: Nov. 12, 2013

(54) SMART CARD-BASED BROWSING SYSTEM AND SMART CARD-BASED BROWSING METHOD AND SMART CARD FOR THE SAME

(75) Inventor: Seung Hwan Kim, Seongnam-si (KR)

(73) Assignee: SK Planet Co., Ltd., Seoul (KR)

( * ) Notice: Subject to any disclaimer, the term of this patent is extended or adjusted under 35 U.S.C. 154(b) by 0 days.

(21) Appl. No.: 13/128,850

(22) PCT Filed: Jul. 8, 2010

(86) PCT No.: PCT/KR2010/004437
§ 371 (c)(1),
(2), (4) Date: May 11, 2011

(87) PCT Pub. No.: WO2011/037316
PCT Pub. Date: Mar. 31, 2011

(65) Prior Publication Data
US 2012/0168494 A1 Jul. 5, 2012

(30) Foreign Application Priority Data
Sep. 22, 2009 (KR) ........................ 10-2009-0089744

(51) Int. Cl.
*G06K 19/06* (2006.01)
(52) U.S. Cl.
USPC ............................. 235/492; 235/380; 235/452
(58) Field of Classification Search
USPC .................... 23/375, 451, 380, 492; 455/558; 235/375, 451, 380, 492
See application file for complete search history.

(56) References Cited

U.S. PATENT DOCUMENTS

| | | | |
|---|---|---|---|
| 8,090,351 B2 * | 1/2012 | Klein | 455/411 |
| 8,090,842 B2 * | 1/2012 | Schirar et al. | 709/227 |
| 2001/0053947 A1 | 12/2001 | Lenz et al. | |
| 2007/0239857 A1 * | 10/2007 | Mahalal et al. | 709/219 |
| 2008/0142586 A1 * | 6/2008 | Hugot et al. | 235/380 |
| 2008/0263649 A1 * | 10/2008 | Smadja et al. | 726/9 |

(Continued)

FOREIGN PATENT DOCUMENTS

| | | |
|---|---|---|
| CN | 101010927 A | 8/2007 |
| GB | 2456499 A | 7/2009 |

(Continued)

OTHER PUBLICATIONS

International Search Report for PCT/KR2010/004437, dated Feb. 23, 2011, citing the above reference(s).

(Continued)

*Primary Examiner* — Tuyen K Vo
(74) *Attorney, Agent, or Firm* — Lowe Hauptman & Ham, LLP

(57) ABSTRACT

Disclosed are a smart card-based browsing system, a smart card-based browsing method, and smart card for the same. A browser is installed in the smart card to form a direct connection path with an SCWS installed in the smart card. The number of sockets for HTTP request/response required to be as many as the number of contents for services between the smart card and the user terminal is reduced, so that the services can be smoothly provided through a rapid and effective interface. A web service can be provided to various multimedia appliances compatible with the smart card regardless of the existence of the browser on the user terminal and the type and version of the browser.

25 Claims, 6 Drawing Sheets

(56) References Cited

U.S. PATENT DOCUMENTS

2009/0127333 A1* 5/2009 Chamley et al. ............... 235/380
2009/0305687 A1* 12/2009 Baldan .......................... 455/419
2011/0111802 A1* 5/2011 Richter et al. ................ 455/558

FOREIGN PATENT DOCUMENTS

| GB | 2457221 A | 8/2009 |
| KR | 10-2008-0087876 | 10/2008 |
| KR | 1020080087876 | 10/2008 |
| KR | 10-2008-0113333 | 12/2008 |
| KR | 1020080113333 | 12/2008 |
| WO | 2009066920 A2 | 5/2009 |

OTHER PUBLICATIONS

Notice of Allowance mailed Jul. 10, 2012 for Korea Patent Application No. 10-2009-0089744 from KIPO, citing the above reference(s).
Michael Dupre, "Modified Broswer" to access a Smart Card Web Server, Jan. 24, 2005, 3 pages, Open Mobile Alliance Ltd.
European Office Action for application No. 10818957.2 dated Jul. 25, 2013.
Chinese Office Action for application No. 201080003712.9 dated Jul. 22, 2013.

* cited by examiner

SMART CARD-BASED BROWSING SYSTEM AND SMART CARD-BASED BROWSING METHOD AND SMART CARD FOR THE SAME

CROSS REFERENCE TO RELATED APPLICATION

This application claims the priority of Korean Patent Application No. 10-2009-0089744, filed on Sep. 22, 2009, in the KIPO (Korean Intellectual Property Office), the disclosure of which is incorporated herein in their entirety by reference. Further, this application is the National Phase application of International Application No. PCT/KR2010/004437, filed Jul. 8, 2010, which designates the United States and was published in Korean. Each of these applications is hereby incorporated by reference in their entirety into the present application.

TECHNICAL FIELD

The present invention relates to a method for providing a web service based on a smart card. More particularly, the present invention relates to a smart card-based browsing system, a smart card-based browsing method, and a smart card for the same, in which a browser (HTTP client) is installed in a smart card to establish a direct connection path with an SCWS (Smart Card Web Server) embedded in the smart card, thereby providing a web service environment.

BACKGROUND ART

Recently, as the capacity of a smart card mounted in a mobile communication terminal has greatly increased, an SCWS (Smart Card Web Server) is provided inside the smart card, so that various service applications can be installed in the smart card. The SCWS provides various web pages and drives various applications through a browser of the mobile communication terminal acting as a client.

In other words, a web server and a browser (HTTP Client) are installed in a smart card and a mobile communication terminal, respectively, so that the smart card and the mobile communication terminal provide a web service through HTTP communication therebetween.

However, according to the prior art described above, the web server installed in the smart card communicates with a remote administration server located in a remote plate, and spends a long time parsing an HTTP message header due to a double structure of the HTTP message header. In addition, as many sockets for HTTP request/response as the number of contents for smart card-user terminal services are required, and applications, which are installed in the smart card and compatible with the HTTP clients, must be developed according to the types and versions of the HTTP clients.

DISCLOSURE

Technical Problem

Accordingly, the present invention has been made to solve the above-mentioned problems occurring in the prior art, and an object of the present invention is to provide a smart card-based browsing system, a smart card-based method, and a smart card for the same, capable of providing a platform to smoothly provide a web service by realizing an HTTP client in a smart card.

Technical Solution

In order to accomplish the above objects, there is provided a smart card-based browsing system including a user terminal receiving a driving signal according to execution of an application embedded in a smart card from the smart card through a driving interface for controlling at least one device resource mounted in the user terminal to drive the at least one device resource, and the smart card forming a connection path with an SCWS (Smart Card Web Server) through a browser embedded in the smart card in response to a request of the user terminal through the driving interface to execute the application based on the SCWS, and sending the driving signal according to the execution of the application to the user terminal to drive the at least one device resource.

In another aspect, there is provided a user terminal including a card interface module forming a driving interface used to communicate with a smart card, connecting to a browser embedded in the smart card through the driving interface to request execution of an application, and receiving a driving signal according to execution of the application from the smart card, and a device driving module receiving the driving signal through the card interface module and driving at least one embedded device resource based on the driving signal.

In yet another aspect, there is provided a smart card including a terminal interface module forming a driving interface for controlling at least one device resource mounted in a user terminal, a browser requesting execution of an embedded application according to a request of the user terminal through the driving interface and sending a driving signal according to the execution of the application to the user terminal through the driving interface to drive the at least one device resource, and an application driving module executing the application according to the request of the execution of the application through the browser and sending the driving signal according to the execution of the application to the browser.

In yet another aspect, there is provided a smart card-based browsing method including requesting, by a user terminal, execution of an application to a smart card through a driving interface for controlling at least one device resource mounted in the user terminal, establishing, by the smart card, a connection path with an SCWS through a browser embedded in the smart card according to the request of the user terminal through the driving interface, executing, by the smart card, the application through the SCWS, sending, by the smart card, the driving signal according to the execution of the application to the user terminal through the driving interface, and driving, by the user terminal, at least one device resource based on the driving signal received through the driving interface.

In yet another aspect, there is provided a smart card-based browsing method including connecting to a browser embedded in a smart card through a driving interface used to communicate with the smart card, requesting execution of an application driven on the smart card through the browser, receiving a driving signal according to the execution of the application from the smart card through the driving interface, and driving at least one device resource based on the received driving signal.

In yet another aspect, there is provided a smart card-based browsing method including receiving an execution request of an application embedded in a smart card from a user terminal through a driving interface for controlling at least one device resource mounted in the user terminal, executing the application through a browser embedded in the smart card according to the request of the user terminal, and sending a driving signal according to the execution of the application to the user terminal through the driving interface to drive the at least one device resource.

Advantageous Effect

According to a smart card-based browsing system, a smart card-based browsing method, and a smart card for the same of the embodiments of the present invention, an HTTP client is installed in the smart card, so that a direct connection path with an SCWS installed in the smart card can be established. Accordingly, the use of internal network resources can be minimized, and a smooth web service environment can be supplied regardless of the type of browser.

MODE OF INVENTION

Hereinafter, an exemplary embodiment of the present invention will be described with referent to accompanying drawings.

Figure 1:
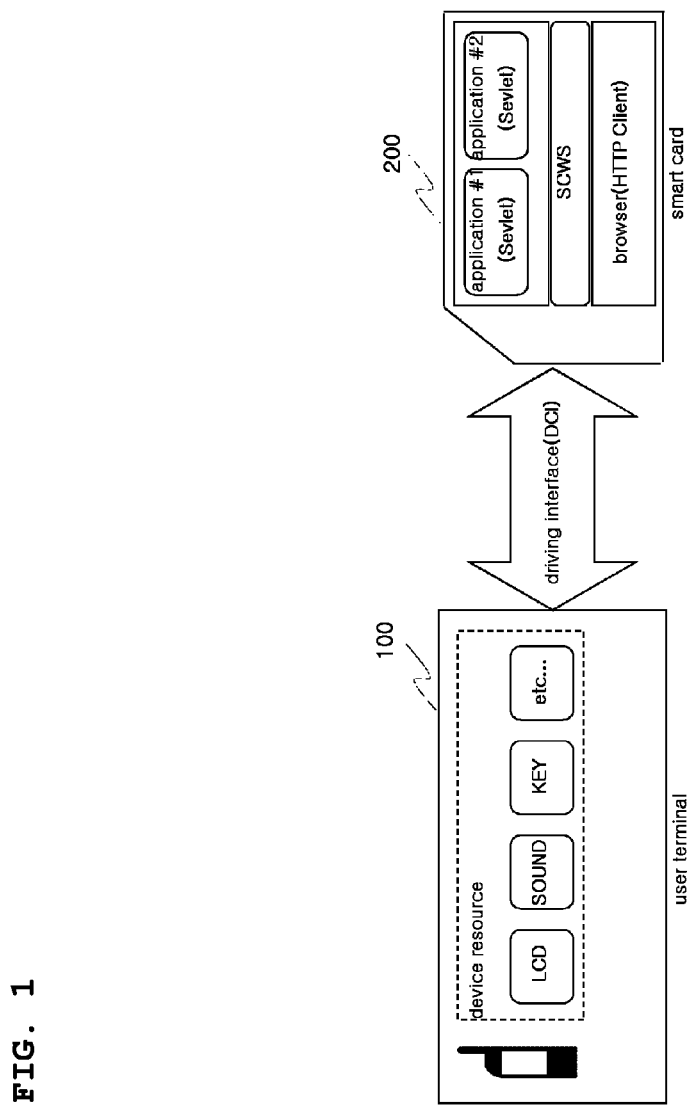
FIG. 1 is a schematic view showing a smart card-based browsing system according to an embodiment of the present invention.

FIG. 1 is a schematic view showing a smart card-based browsing system according to the embodiment of the present invention.

As shown in FIG. 1, the smart card-based browsing system includes a user terminal 100 for receiving a driving signal from a smart card 200 as an application embedded in the smart card is executed so that a specific device resource interworking with the application can be driven, and the smart card 200 for executing an application based on an SCWS (Smart Card Web Server) function through an HTTP client embedded in the smart card 200. In this case, the SCWS is a web server realized in the smart card 200 and provides a servlet container complying with the Servlet 2.x standard. Accordingly, the execution environment of the application corresponding to the servlet can be provided.

The user terminal 100 receives a driving signal from the smart card 200 through a driving interface for controlling at least one device resource mounted in the user terminal 100 as an application embedded in the smart card 200 is executed.

The smart card 200 establishes a connection path with the SCWS through a browser embedded in the smart card 200 in response to the request of the user terminal 100 through the driving interface, so that the application can be executed based on the SCWS. Then, the smart card 200 sends the driving signal according to the execution of the application to the user terminal 100, so that at least one device resource can be driven.

Hereinafter, the smart card-based browsing system according to one embodiment of the present invention will be described in more detail.

The user terminal 100 connects to the smart card 200 through the driving interface for controlling at least one device resource mounted in the user terminal 100. In more detail, the user terminal 100 includes at least one device resource, such as an LCD, a speaker, or a key pad, having a user interface UI. In addition, the user terminal 100 forms a communication channel with the smart card 200 based on the driving interface for controlling the device resource to provide a connection environment with respect to the smart card 200. In this case, the driving interface refers to a DCI (Device Control Interface) defined based on a USB (Universal Serial Bus).

Accordingly, the user terminal 100 connects to the smart card 200 through the driving interface to request the execution of a specific application. In more detail, the user terminal 100 connects to a browser embedded in the smart card 200 through the driving interface based on a USB protocol and requests the execution of the specific application based on the SCWB. In other words, the user terminal 100 connects to the SCWS based on a HTTP (Hypertext Transfer Protocol) through the browser and requests the execution of the specific application.

In addition, the user terminal 100 receives a driving signal from the smart card 200 according to the execution of the specific application to drive a specific device resource interworking with the specific application. In more detail, the user terminal 100 drives a specific device resource interworking with the specific application from among at least one device resource mounted in the user terminal 100 based on the driving signal according to the execution of the specific application which is received from the smart card 200 through the driving interface based on the USB protocol.

The smart card 200 includes at least one application executed based on the SCWS and executes a specific application according to the request of the user terminal 100 through the driving interface. In more detail, the smart card 200 receives the request of the execution of the specific application embedded therein from the user terminal 100 through the driving interface based on the USB protocol. Accordingly, the smart card 200 establishes a connection path with the SCWS through the browser embedded in the smart card 200 according to the request of the user terminal 100 to execute the specific application. In other words, the smart card 200 establishes the connection path with the SCWS based on the HTTP through the embedded browser according to the request of the user terminal 100 to execute the specific application corresponding to a servlet. Meanwhile, the smart card 200 not only executes an application corresponding to a servlet based on the SCWS, but also executes a MIDlet application realized based on a middle ware function such as JVM (Java Virtual Machine) through the embedded browser. In other words, the smart card 100 may form the interface with an application framework located at the upper portion of an OS (Operation System) of the smart card 200 through the embedded browser, and execute the MIDlet application realized based on the JVM located at the upper portion of the application framework layer according to the request of the user terminal 100.

In addition, the smart card 200 sends the driving signal according to the execution of the specific application to the user terminal 100 to request the driving of the interworking device resource. In more detail, the smart card 200 sends the driving signal according to the execution of the specific application to the user terminal 100 through the driving interface based on the USB protocol, so that the device resource interworking with the specific application can be driven on the user terminal 100. In this case, the smart card 200 converts initial output information according to the execution of the specific application into an original signal including RAW data used to display an image through the embedded browser and PCM data used to reproduce sound and performs a rendering process. Then, the smart card 200 sends the driving signal corresponding to the original signal to the user terminal 100 so that the interworking device resource can be driven.

Figure 2:
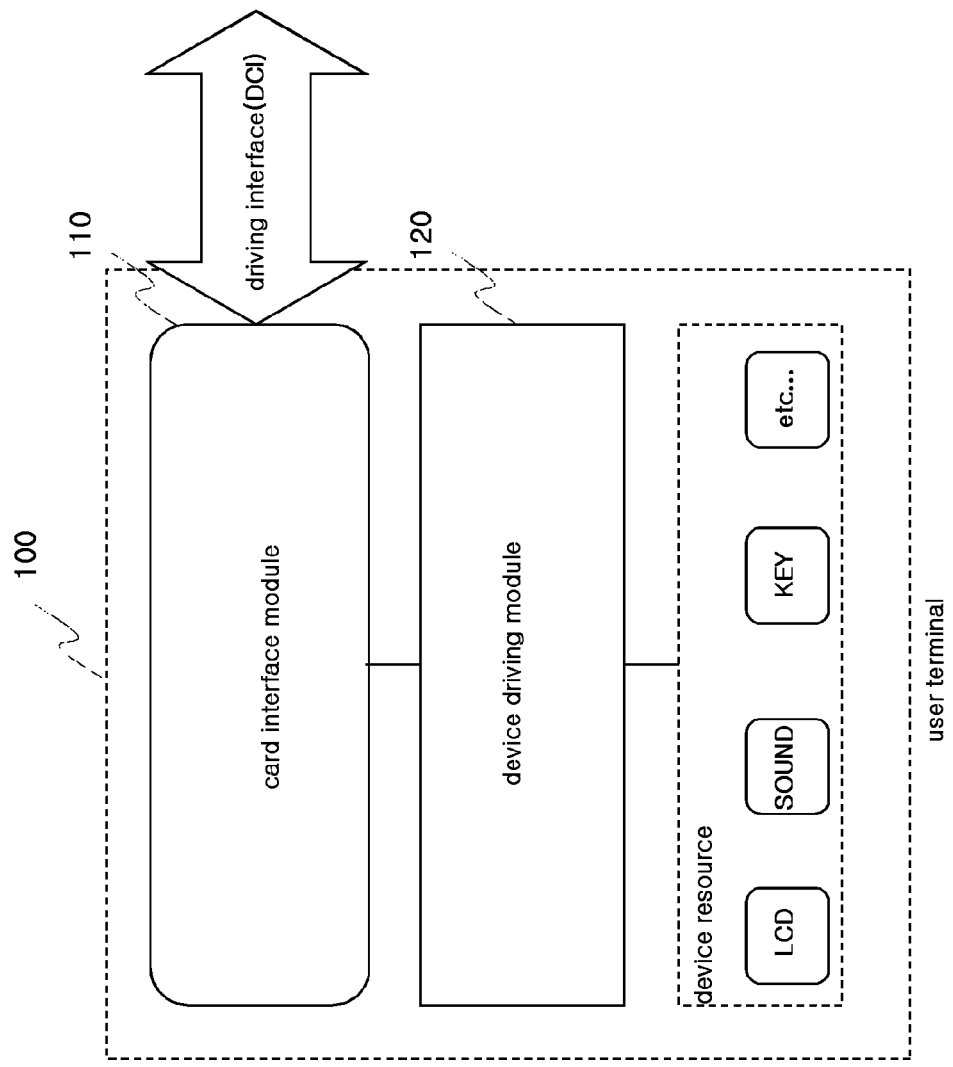
FIG. 2 is a schematic view showing a user terminal according to the embodiment of the present invention.

Hereinafter, the structure of the user terminal 100 will be described in detail with reference to FIG. 2. In other words, the user terminal 100 includes a card interface module 110 to provide a connection path with the smart card 200 and a device driving module 120 to drive a specific device resource interworking with a specific application based on the driving signal according to the execution of the specific application received from the smart card 200 through the card interface module 110. The card interface module 110 forms a driving interface used to communicate with the smart card 200. The card interface module 110 connects to a browser embedded in the smart card 200 through the driving interface to request the execution of the application and receives the driving signal according to the execution of the application from the smart card 200.

The device driving module 120 receives the driving signal through the card interface module 110 and drives at least one device resource mounted thereon based on the driving signal.

In this case, according to one embodiment of the present invention, the card interface module 110 connects to the browser embedded in the smart card 200 through the driving interface based on the USB protocol to request the execution of the application.

In addition, according to one embodiment of the present invention, the card interface module 110 connects to the SCWS embedded in the smart card 200 based on the HTTP through the browser to request the execution of the application based on the SCWS.

Hereinafter, the structure of the user terminal 100 according to one embodiment of the present invention will be described in more detail.

The card interface module 110 forms the driving interface used to communicate with the smart card 200 and connects to the smart card 200 through the driving interface to request the execution of a specific application based on the SCWS. In more detail, the card interface module 110 forms a communication channel with the smart card 200 based on the driving interface for controlling at least one mounted device resource, thereby providing a connection environment to the smart card 200. Accordingly, the card interface module 110 connects to the browser embedded in the smart card 200 through the driving interface based on the USB protocol to request the specific application driven based on the SCWS. In other words, the card interface module 110 connects to the SCWS based on the HTTP through the browser embedded in the smart card 200 to request the execution of the specific application.

In addition, the card interface module 110 receives the driving signal according to the execution of the specific application from the smart card 200. In more detail, the card interface module 110 receives the driving signal according to the execution of the specific application from the smart card 200 through the driving interface based on the USB protocol to send the driving signal to the device driving module 120.

The device driving module 120 receives the driving signal according to the execution of the specific application to drive a specific device resource interworking with the specific application. In more detail, the device driving module 100 receives the driving signal according to the execution of the specific application, which has been received from the smart card 200 through the driving interface based on the USB protocol, from the card interface module 110 to drive a specific device resource interworking with the specific application from among at least one device resource mounted in the user terminal 100.

Figure 3:
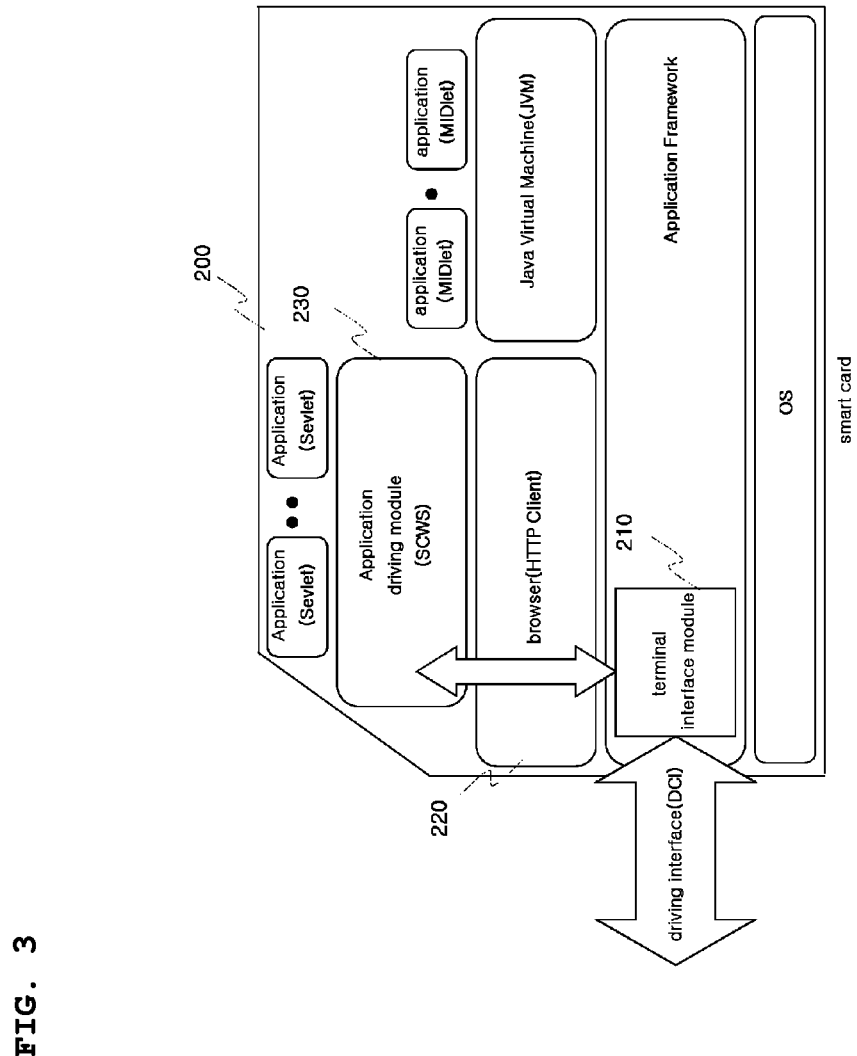
FIG. 3 is a schematic view showing a smart card according to the embodiment of the present invention.

Hereinafter, the structure of the smart card 200 will be described in detail with reference to FIG. 3. In other words, the smart card 200 includes a terminal interface module 210 to provide a connection path to the user terminal 100, a browser 220 establishing a connection path with the SCWS according to the request of the user terminal 100 to request the execution of the specific application, and an application driving module 230 to execute a specific application according to the execution request of the browser 220. The application driving module 230 is a web server realized in the smart card 200 to provide a servlet container. Accordingly, the application driving module 230 is designated as a SCWS to provide the above driving environment of applications corresponding to the servlets.

The terminal interface module 210 forms a driving interface for controlling at least one device resource mounted in the user terminal 100.

The browser 220 requests the execution of the application embedded in the smart card 200 according to the request of the user terminal 100 through the driving interface and sends the driving signal according to the execution of the application to the user terminal 100 through the terminal interface module 210 so that at least one device resource can be driven.

The application driving module 230 executes the application according to the request for the execution of the application through the browser 220 and sends the driving signal according to the execution of the application to the browser 220.

In this case, according to the embodiment of the present invention, the terminal interface module 210 may send the driving signal according to the execution of the application to the user terminal 100 through the driving interface based on the USB protocol.

In addition, according to one embodiment of the present invention, the application driving module 230 serves as an SCWS establishing a connection path with the browser 220 based on the HTTP and can execute an application based on the SCWS according to the execution request of the application through the browser 220.

Hereinafter, the smart card 200 according to one embodiment of the present invention will be described in more detail.

The terminal interface module 210 forms the driving interface for controlling at least one device resource mounted in the user terminal 100. In more detail, the terminal interface module 210 forms a communication channel with the user terminal 100 based on the driving interface that is a USB protocol-based interface for controlling at least one device resource mounted on the user terminal 100, thereby providing a connection environment for the user terminal 100.

The browser 220 establishes a connection path with the SCWS according to the request of the user terminal 100 through the driving interface to request the execution of the specific application. In more detail, the browser 220 receives the execution request for a specific application from the user terminal 100 through the driving interface based on the USB protocol provided by the terminal interface module 210. Accordingly, the browser 220 establishes a connection path with the application driving module 230, that is, the SCWS based on the HTTP, thereby requesting the execution of the specific application based on the SCWS to the application driving module 230. In addition, the browser 220 receives the driving signal according to the execution of the specific application from the application driving module 230 to send the driving signal to the user terminal 100 through the driving interface provided by the terminal interface module 210, so that the device resource interworking with the specific application can be driven. In more detail, the browser 220 converts output information received from the application driving module 230 according to the execution of the specific application into an original signal including RAW data used to display an image and PCM data used to reproduce sound and performs a rendering process. The driving signal corresponding to the original signal is sent to the user terminal 100 through the terminal interface module so that the interworking device resource can be driven.

The application driving module 230 sends the driving signal according to the execution of the specific application to the user terminal 100 to request the driving of the interworking device resource. In more detail, the application driving module 230 executes the specific application according to the execution request of the browser 220 and sends the driving signal according to the execution of the specific application to the browser 220. Meanwhile, according to the present embodiment, although the application driving module 230 is applied to a component corresponding to an SCWS embedded in the smart card 200, the application driving module 230 is applicable to a component corresponding to a middle ware such as a JVM embedded in the smart card 200. In other words, the browser 220 may form an interface with an application framework located above the OS of the smart card 200. Based on the interface, the application driving module 230 may execute the MIDlet application based on the function of the JVM provided above the application framework layer according to the request of the user terminal 100.

As described above, according to the smart card-based browsing system of the embodiment of the present invention, the browser 300 is installed in the smart card 200 to establish a direct connection path with the SCWS installed in the smart card 200. Accordingly, the number of sockets for HTTP request/response required to be as many as the number of contents for services between the smart card 200 and the user terminal 100 can be reduced, so that the services can be smoothly provided through a rapid and effective interface. In addition, a web service can be provided to various multimedia appliances compatible with the smart card 200 regardless of the existence of the browser on the user terminal 100 and the type or version of the browser.

Figure 5:
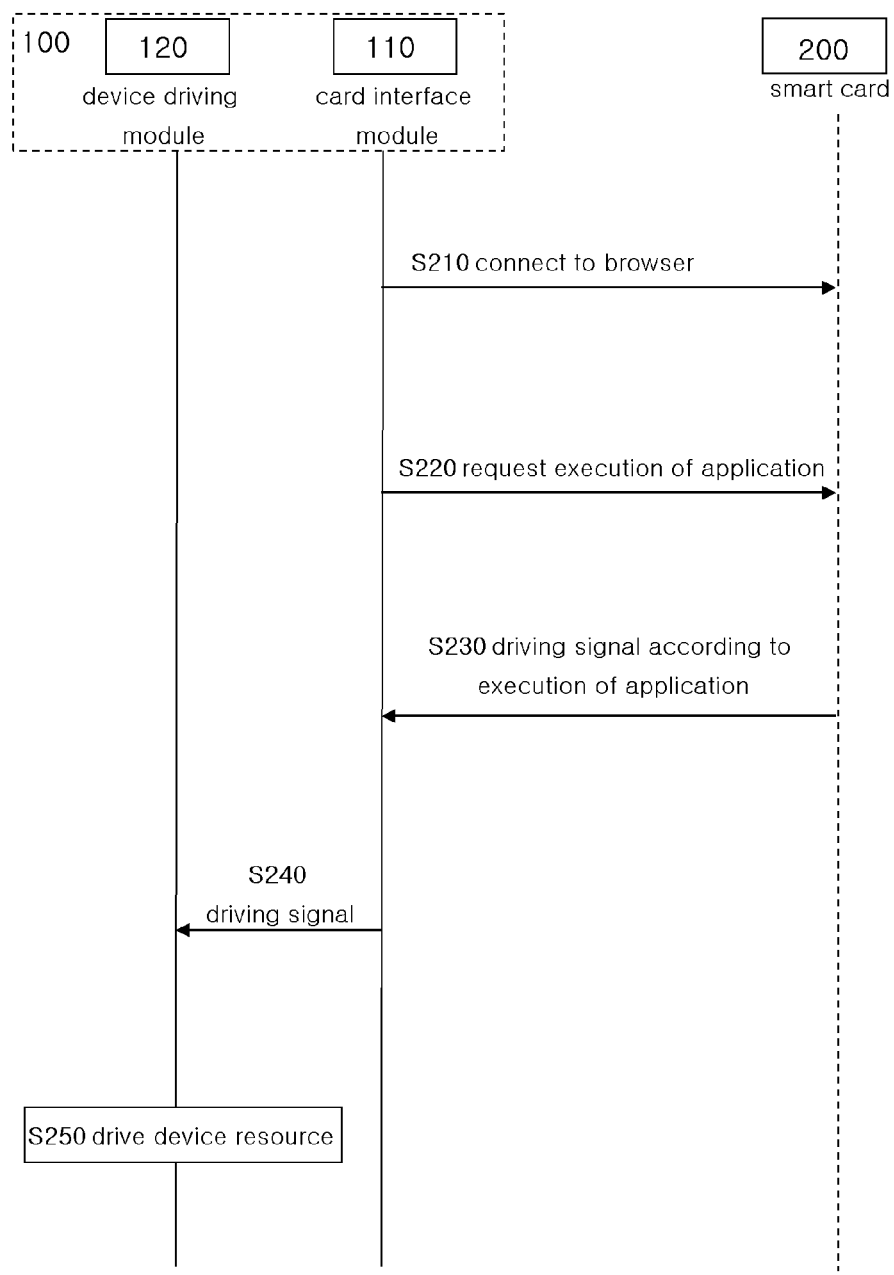
Figure 6:
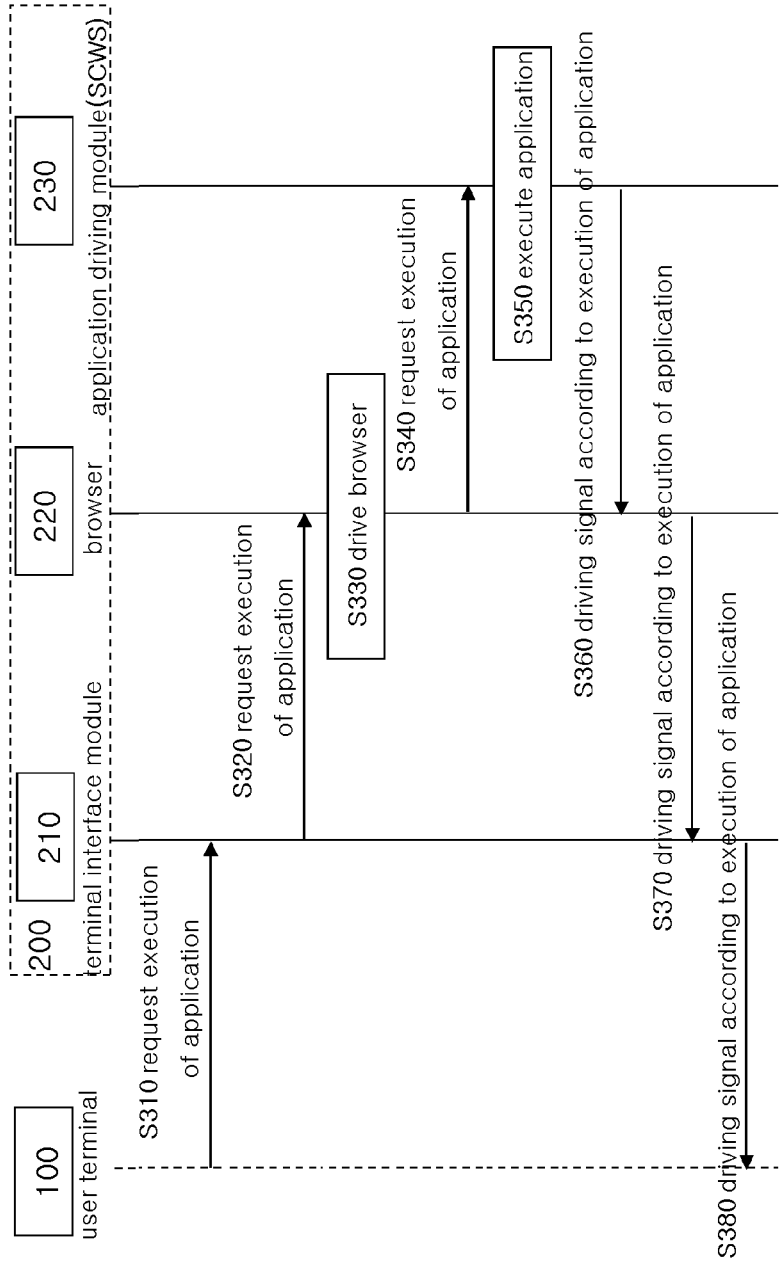

Hereinafter, the smart card-based browsing method according to the embodiment of the present invention will be described with reference to FIGS. 4 to 6. For the purpose of explanation, the structure and components shown in FIGS. 1 to 3 will be described with the related reference numbers.

First, the method for driving the smart card-based browsing system according to the embodiment of the present invention will be described with reference to FIG. 4.

First, the overall driving method of the smart card-based browsing system according to the embodiment of the present invention will be described.

The method for driving the smart card-based browsing system according to one embodiment of the present invention includes an application execution requesting step for requesting by the user terminal 100 the execution of an application to the smart card 200 through the driving interface for controlling at least one device resource mounted in the user terminal 100. A web server connecting step for establishing by the smart card 200 a connection path with the SCWS through the browser embedded in the smart card 200 according to the request of the user terminal 100 through the driving interface, an application executing step of executing by the smart card 200 the application through the SCWS, a driving signal sending step for sending by the smart card 200 the driving signal according to the execution of the application to the user terminal 100 through the driving interface, and a device driving step for driving by the user terminal 100 at least one device resource based on the driving signal received through the driving interface.

Hereinafter, the method for driving the smart card-based browsing system according to one embodiment of the present invention will be described in more detail.

First, the user terminal 100 requests the execution of a specific application to the smart card 200 through the driving interface for controlling at least one device resource mounted in the user terminal 100 (steps S110 and S120). Preferably, the user terminal 100 connects to the browser embedded in the smart card 200 through the driving interface based on the USB protocol to request the execution of the specific application based on the SCWS.

Then, the smart card 200 connects to the SCWS through the embedded browser according to the request of the user terminal 100 through the driving interface (steps S130 and S140). Preferably, the smart card 200 establishes a connection path with the SCWS based on the HTTP through the embedded browser according to the request of the user terminal 100.

Then, the smart card 200 executes the specific application based on the SCWS (step S150).

Next, the smart card 200 sends the driving signal according to the execution of the specific application to the user terminal 100 through the driving interface (step S160). Preferably, the smart card 200 executes the specific application and sends the driving signal according to the execution of the specific application to the user terminal 100 through the driving interface based on the USB protocol. In more detail, the smart card 200 converts output information according to the execution of the specific application into an original signal including RAW data used to display an image through the embedded browser and PCM data used to reproduce sound and performs a rendering process. Then, the smart card 200 sends the driving signal corresponding to the original signal to the user terminal 100 so that the interworking device resource can be driven.

Thereafter, the user terminal 100 receives the driving signal according to the execution of the application embedded in the smart card 200 through the driving interface to drive the specific device resource interworking with the application (step S170). Preferably, the user terminal 100 drives a specific device resource interworking with a specific application from among at least one device resource mounted in the user terminal 100 based on the driving signal according to the execution of the specific application received from the smart card 200 through the driving interface based on the USB protocol.

Hereinafter, a smart card-based browsing method of the user terminal 100 according to one embodiment of the present invention will be described with reference to FIG. 5.

First, the overall smart card-based browsing method in the user terminal 100 according to one embodiment of the present invention will be described.

The smart card-based browsing method in the user terminal 100 according to one embodiment of the present invention includes a smart card connecting step for connecting to the browser embedded in the smart card 200 through the driving interface used to communicate with the smart card 200, an application execution requesting step for requesting the execution of the application driven on the smart card 200 through the browser, a driving signal receiving step for receiving the driving signal according to the execution of the application from the smart card 200 through the driving interface, and a device driving step for driving at least one device resource based on the received driving signal.

In this case, according to one embodiment of the present invention, in the smart card connecting step, the user terminal 100 can connect with the browser embedded in the smart card 200 through the driving interface based on the USB protocol.

In addition, according to one embodiment of the present invention, in the application execution requesting step, the user terminal 100 connects to the SCWS provided in the smart card 200 based on the HTTP through the browser, thereby requesting the execution of the application based on the SCWC.

Hereinafter, the smart card-based browsing method in the user terminal 100 according to one embodiment of the present invention will be described in more detail.

Figure 4:
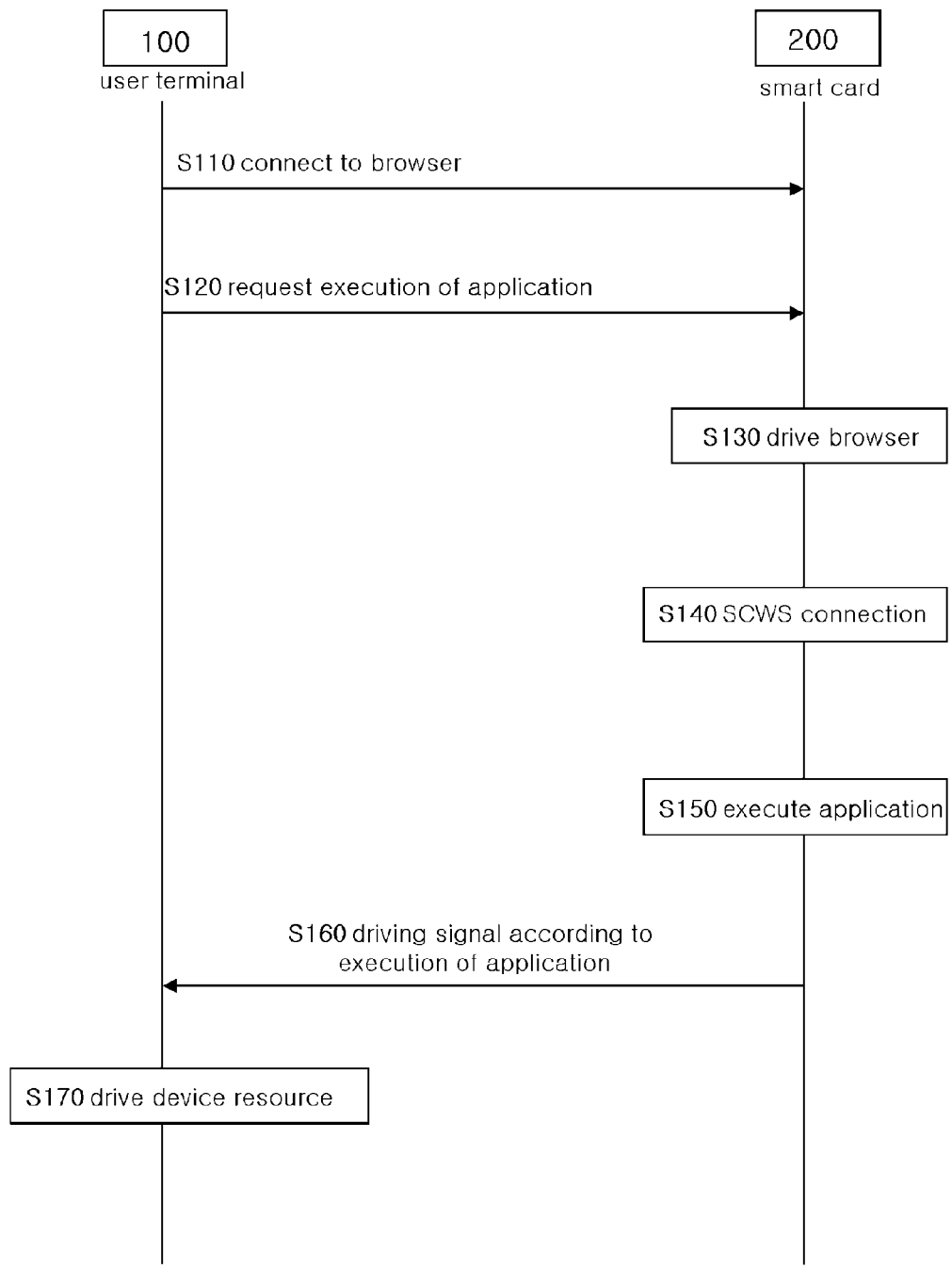
FIGS. 4 to 6 are flowcharts showing a smart card-based browsing method according to the embodiment of the present invention.

First, the user terminal 100 connects to the smart card 200 through the driving interface (step S210 corresponding to step S110 of FIG. 4). Preferably, the card interface module 110 connects to the browser embedded in the smart card 200 through the driving interface based on the USB protocol.

Then, the user terminal 100 requests the execution of a specific application based on the SCWS (step S220 corresponding to step S120 of FIG. 4). Preferably, the card interface module 110 connects to the SCWS based on the HTTP through the browser embedded in the smart card 200 to request the execution of the specific application.

Then, the user terminal 100 receives the driving signal according to the execution of the specific application from the smart card 200 through the driving interface (steps S230 and S240 corresponding to step S160 of FIG. 4). Preferably, the card interface module 110 receives the driving signal according to the execution of the specific application from the smart card 200 through the driving interface based on the USB protocol and sends the driving signal to the device driving module 120.

Thereafter, the user terminal 100 drives a specific device resource interworking with a specific application from among at least one device resource mounted in the user terminal 100 based on the driving signal according to the execution of the specific application (step S250 corresponding to step S170 of FIG. 4).

Hereinafter, the smart card-based browsing method of the smart card 200 according to one embodiment of the present invention will be described with reference to FIG. 6.

First, the overall procedure in the smart card-based browsing method of the smart card 200 according to one embodiment of the present invention will be described below.

The smart card-based browsing method of the smart card 200 according to one embodiment of the present invention includes an application execution requesting receiving step for receiving the execution request of an application embedded in the smart card 200 from the user terminal 100 through the driving interface for controlling at least one device resource mounted in the user terminal 100, an application executing step for executing the application through the browser embedded in the smart card 200 according to the request of the user terminal 100, and a driving signal sending step for sending the driving signal according to the execution of the application to the user terminal 100 through the driving interface to drive at least one device resource.

In this case, according to one embodiment of the present invention, in the application executing step, the connection path is formed with the SCWS based on the HTTP through the browser, so that the application can be executed based on the SCWS.

In addition, according to one embodiment of the present invention, in the driving signal sending step, the smart card 200 can send the driving signal to the user terminal 100 according to the execution of the application through the driving interface based on the USB protocol.

Hereinafter, the smart card-based browsing method of the smart card 200 according to one embodiment of the present invention will be described in more detail.

First, the smart card 200 receives the request for the execution of a specific application from the user terminal 100 (steps S310 and S320 corresponding to step S120 of FIG. 4). Preferably, the browser 220 receives the request for the execution of an embedded specific application from the user terminal 100 through the driving interface based on the USB protocol which is provided by the terminal interface module 210.

Then, the smart card 200 executes the specific application according to the request of the user terminal 100 (steps S330 to S350 corresponding to steps S130 to S150 of FIG. 4). Preferably, the browser 220 establishes a connection path with the application driving module 230, that is, the SCWS based on the HTTP, to request the execution of the specific application based on the SCWS to the application driving module 230. In addition, the application driving module 230 executes the specific application according to the execution request of the browser 220.

Thereafter, the driving signal according to the execution of the specific application is sent to the user terminal 100 through the driving interface (steps S360 to S380 corresponding to step S160 of FIG. 4). Preferably, the application driving module 230 sends the driving signal according to the execution of the specific application to the browser 220, and the browser 220 receiving the driving signal sends the driving signal to the user terminal 100 through the driving interface provided by the terminal interface module 210, so that the device resource interworking with the specific application is driven on the user terminal 100. In more detail, the browser 220 converts output information received from the application driving module 230 according to the execution of the specific application into an original signal including RAW data used to display an image and PCM data used to reproduce sound and performs a rendering process. The browser 220 sends the driving signal corresponding to the original signal to the user terminal 100 through the terminal interface module 210 so that the interworking device resource can be driven.

As described above, according to the smart card-based browsing method of the embodiment of the present invention, the browser 300 is installed in the smart card 200 to form a direct connection path with the SCWS installed in the smart card 200. Accordingly, the number sockets for HTTP request/response required to be as many as the number of contents for services between the smart card 200 and the user terminal 100 can be reduced, so that the services can be smoothly provided through a rapid and effective interface. In addition, a web service can be provided to various multimedia appliances compatible with the smart card 200 regardless of the existence of the browser on the user terminal 100 and the type and version of the browser.

The method and steps of the algorithm described above related to the embodiments of the present invention may be realized in the form of hardware, software executed by a processor, or combination of the hardware and software. The software module may reside in a storage medium, such as a RAM memory, a flash memory, a ROM memory, an EPROM memory, an EEPROM memory, registers, a hard disc, a mobile disc, a CD-ROM, or other storage devices generally known in the art. The storage medium is connected to the processor, so that the processor may read information from the storage medium or record the information onto the storage medium. Alternatively, the storage medium can be integrated in the processor. The processor and the storage medium may be included in an ASIC. The ASIC may be included in the terminal. Alternatively, the processor and the storage medium may serve as components of the terminal.

Although exemplary embodiments of the present invention have been described for illustrative purposes, those skilled in the art will appreciate that various modifications, additions and substitutions are possible, without departing from the scope and spirit of the invention as disclosed in the accompanying claims.

INDUSTRIAL APPLICABILITY

The smart card-based browsing system, the smart card-based browsing method, and the smart card for the same of the embodiments of the present invention are distinguished from the conventional technology in that a browser (HTTP Client) is installed in the smart card so that a direction connection path with the SCWS can be established. Accordingly, the present invention can be made sufficiently available on the related market and in business, and can be utilized in practice, thus the present invention has industrial applicability.

The invention claimed is:

1. A smart card-based browsing system, comprising:
a user terminal configured to
receive a driving signal according to execution of an application embedded in a smart card from the smart card through a driving interface for driving at least one device resource mounted in the user terminal to drive the at least one device resource; and
the smart card configured to
form a connection path with a Smart Card Web Server (SCWS) through a browser in response to a request of the user terminal through the driving interface to execute the application by the SCWS, wherein the SCWS and the browser are embedded in the smart card, and
send the driving signal according to the execution of the application to the user terminal to drive the at least one device resource.

2. The smart card-based browsing system of claim 1, wherein the SCWS provides a servlet container and an execution environment of the application corresponding to a servlet based on the servlet container.

3. The system of claim 1, wherein the smart card is mounted in the user terminal.

4. A user terminal, comprising:
a card interface module configured to
form a driving interface to communicate with a smart card,
connect to a browser embedded in the smart card through the driving interface to request execution of an application by a Smart Card Web Server (SCWS) embedded in the smart card, and
receive a driving signal according to execution of the application from the smart card; and
a device driving module configured to
receive the driving signal through the card interface module, and
drive at least one embedded device resource based on the driving signal.

5. The user terminal of claim 4, wherein the card interface module is further configured to connect to the browser embedded in the smart card through the driving interface based on a Universal Serial Bus (USB) protocol to request the execution of the application.

6. The user terminal of claim 5, wherein the card interface module is further configured to connect to the SCWS provided in the smart card based on an Hypertext Transfer Protocol (HTTP) through the browser to request the execution of the application by the SCWS.

7. The user terminal of claim 4, wherein the SCWS provides a servlet container and an execution environment of the application corresponding to a servlet based on the servlet container.

8. A smart card, comprising:
a terminal interface module configured to form a driving interface for driving at least one device resource mounted in a user terminal;
a browser configured to
request execution of an application embedded in the smart card according to a request of the user terminal through the driving interface, and
send a driving signal according to the execution of the application to the user terminal through the driving interface to drive the at least one device resource; and
a Smart Card Web Server (SCWS) configured to
execute the application according to the request of the execution of the application through the browser, and
send the driving signal according to the execution of the application to the browser.

9. The smart card of claim 8, wherein the terminal interface module is further configured to send the driving signal according to the execution of the application to the user terminal through the driving interface based on a Universal Serial Bus (USB) protocol.

10. The smart card of claim 8, wherein the application driving module is configured to
form a connection path with the browser based on an Hypertext Transfer Protocol (HTTP) and
execute the application based on the SCWS according to the request of the Execution of the application through the browser.

11. The smart card of claim 8, wherein the SCWS provides a servlet container and an execution environment of the application corresponding to a servlet based on the servlet container.

12. A smart card-based browsing method, comprising:
sending, by a user terminal, a request for execution of an application to a smart card through a driving interface for driving at least one device resource mounted in the user terminal;
establishing, by the smart card, a connection path with an Smart Card Web Server (SCWS) embedded in the smart card through a browser embedded in the smart card according to the request of the user terminal through the driving interface;
executing, by the smart card, the application through the SCWS;
sending, by the smart card, the driving signal according to the execution of the application to the user terminal through the driving interface; and
driving, by the user terminal, the at least one device resource based on the driving signal received through the driving interface.

13. The smart card-based browsing method of claim 12, wherein the SCWS provides a servlet container and an execution environment of the application corresponding to a servlet based on the servlet container.

14. A smart card-based browsing method, the method performed by a user terminal and comprising:
connecting to a browser embedded in a smart card through a driving interface to communicate with the smart card;

requesting execution of an application driven on an Smart Card Web Server (SCWS) embedded in the smart card through the browser;

receiving a driving signal according to the execution of the application from the smart card through the driving interface; and driving at least one device resource based on the received driving signal.

15. The method of claim 14, wherein the connecting connects to the browser embedded in the smart card through the driving interface based on a Universal Serial Bus (USB) protocol.

16. The method of claim 14, wherein the requesting requests the execution of the application based on the SCWS by connecting to the SCWS embedded in the smart card based on Hypertext Transfer Protocol (HTTP) through the browser.

17. The smart card-based browsing method of claim 14, wherein the SCWS provides a servlet container and an execution environment of the application corresponding to a servlet based on the servlet container.

18. A smart card-based browsing method, the method performed by a smart card and comprising:

receiving an execution request of an application embedded in the smart card from a user terminal through a driving interface for driving at least one device resource mounted in the user terminal;

executing the application by a Smart Card Web Server (SCWS) embedded in the smart card in response to the request of the user terminal received through a browser embedded in the smart card; and sending a driving signal according to the execution of the application to the user terminal through the driving interface to drive the at least one device resource.

19. The method of claim 18, wherein the executing executes the application based on the SCWS by forming a connection path with an SCWS embedded in the smart card based on Hypertext Transfer Protocol (HTTP) through the browser.

20. The method of claim 18, wherein the sending sends the driving signal according to the execution of the application to the user terminal through the driving interface based on a Universal Serial Bus (USB) protocol.

21. The smart card-based browsing method of claim 18, wherein the executing executes the application based on the SCWS by forming a connection path with the SCWS embedded in the smart card based on Hypertext Transfer Protocol (HTTP) through the browser, and wherein the SCWS provides a servlet container and an execution environment of the application corresponding to a servlet based on the servlet container.

22. A computer-readable recording medium comprising computer readable code to control at least one processing device to implement a smart card-based browsing method comprising:

connecting to a browser embedded in a smart card through a driving interface to communicate with the smart card;

requesting execution of an application driven on a Smart Card Web Server embedded in the smart card through the browser;

receiving a driving signal according to the execution of the application from the smart card through the driving interface; and driving at least one device resource based on the received driving signal.

23. The computer-readable recording medium of claim 22, wherein the SCWS provides a servlet container and an execution environment of the application corresponding to a servlet based on the servlet container.

24. A computer-readable recording medium comprising computer readable code to control at least one processing device to implement a smart card-based browsing method comprising:

receiving an execution request of an application embedded in a smart card from a user terminal through a driving interface for driving at least one device resource mounted in the user terminal;

executing the application by a Smart Card Web Server (SCWS) embedded in the smart card in response to the request of the user terminal received through a browser embedded in the smart card; and sending a driving signal according to the execution of the application to the user terminal through the driving interface to drive the at least one device resource.

25. The computer-readable recording medium of claim 24, wherein the SCWS provides a servlet container and an execution environment of the application corresponding to a servlet based on the servlet container.

* * * * *